(12) United States Patent
Kim et al.

(10) Patent No.: US 10,850,436 B2
(45) Date of Patent: *Dec. 1, 2020

(54) INTERIOR MATERIAL INCLUDING LIGHT-BLOCKING LAYER CAPABLE OF LIGHT EMISSION THROUGH VARIOUS LOGO PATTERNS AND METHOD OF MANUFACTURING THE SAME

(71) Applicants: INTOPS CO., LTD., Anyang-si (KR); Keun ha Kim, Anyang-si (KR)

(72) Inventors: Keun ha Kim, Anyang-si (KR); Won jae Choi, Anyang-si (KR); Hong il Lee, Anyang-si (KR)

(73) Assignee: INTOPS CO., LTD., Anyang-si (KR)

( * ) Notice: Subject to any disclaimer, the term of this patent is extended or adjusted under 35 U.S.C. 154(b) by 87 days.

This patent is subject to a terminal disclaimer.

(21) Appl. No.: 16/194,361

(22) Filed: Nov. 18, 2018

(65) Prior Publication Data

US 2020/0139595 A1 May 7, 2020

(30) Foreign Application Priority Data

Nov. 1, 2018 (KR) .................. 10-2018-0132951

(51) Int. Cl.
*B29C 45/00* (2006.01)
*B32B 21/08* (2006.01)
*B32B 3/26* (2006.01)
*B32B 7/12* (2006.01)

(52) U.S. Cl.
CPC .......... *B29C 45/0053* (2013.01); *B32B 3/266* (2013.01); *B32B 7/12* (2013.01); *B32B 21/08* (2013.01)

(58) Field of Classification Search
CPC ....... B29C 45/0053; B32B 7/12; B32B 3/266; B32B 21/08
USPC .......................................... 156/242
See application file for complete search history.

(56) References Cited

U.S. PATENT DOCUMENTS

| 9,358,944 | B1 | 6/2016 | Aselage et al. |
| 2002/0031620 | A1 | 3/2002 | Yuzawa et al. |
| 2008/0160724 | A1* | 7/2008 | Song ........................ H01L 21/78 438/462 |
| 2020/0139670 | A1* | 5/2020 | Kim ........................ B32B 9/045 |

FOREIGN PATENT DOCUMENTS

| DE | 10118178 A1 | 10/2002 |
| KR | 2018-0071801 A | 6/2018 |

* cited by examiner

*Primary Examiner* — Philip C Tucker
*Assistant Examiner* — Vicki Wu
(74) *Attorney, Agent, or Firm* — KORUS Patent, LLC; Seong Il Jeong

(57) ABSTRACT

Disclosed herein is a method of manufacturing an interior material, which can implement various and distinct light emission effects by disposing a light-blocking layer configured to block light emitted from a light source at a location adjacent to an inner transparent film and then allowing the component of the transparent film to fill lighting grooves formed by laser-etching. Since a tape configured to support an island is employed, stable manufacturing is possible throughout an overall process.

4 Claims, 6 Drawing Sheets

INTERIOR MATERIAL INCLUDING LIGHT-BLOCKING LAYER CAPABLE OF LIGHT EMISSION THROUGH VARIOUS LOGO PATTERNS AND METHOD OF MANUFACTURING THE SAME

BACKGROUND

1. Technical Field

The present invention relates to an interior material including a light-blocking layer capable of light emission through various logo patterns, and a method of manufacturing the same. More specifically, the present invention relates to an interior material including an improved light-blocking structure required to selectively emit light through logo patterns, and a method of manufacturing the same.

2. Description of the Related Art

The term "interior material" refers to a material used to finish the exterior of a product. The interior material functions to improve the appearance of a product, such as texture and touch feeling, and to protect internal components by blocking noise, flame, oxygen, etc. The interior material is preferably manufactured so that aesthetic elements can be expressed externally.

Korean Patent No. 10-0913811 discloses a molded article including a real wood film, which is used as an interior material. The molded article is manufactured by heat-pressing an adhesive film on the upper and lower sides of a real wool sheet. The molded article manufactured as described above is applied to automotive interior/exterior materials or various electronic product panels. Since the interior material includes the real wood material, it mimics the texture of natural wood, and thus can show an aesthetic appearance.

In recent years, as shown in FIG. 1, an interior material having a logo 102,' such as "ABCDE", formed on a molded article made of real wood material has been proposed. This interior material is configured to emit light through the logo 102.' A portion isolated from other portions by the logo is an island.

As a method of emitting light through the logo 102,' Korean Patent No. 10-1883080, filed by the present applicant, discloses a technology of emitting light through the logo portion by forming a light-blocking layer under a real wood layer which is a main surface material, forming a touch sensor electrode under the light-blocking layer, and disposing a light source under the touch sensor electrode. However, in the above-mentioned patent, a lighting groove through which light passes is hollow, and thus a foreign material, such as dust, may be deposited in the hollow portion, thus reducing transmittance. In addition, the disclosed technology has disadvantages in that it is difficult to apply to a composite film structure composed of two or more film layers, and thus the molded article has weak durability, and in that it is difficult to form various logo patterns. Furthermore, since the molded article has no support configured to support the island portion, a problem arises in that the precise injection molding of the island portion is difficult during the manufacture of the molded article.

SUMMARY

Accordingly, an object of the present invention is to provide a method of manufacturing an interior material, which can form logo lighting portions having various patterns and can easily manufacture an interior material having excellent durability.

The method of manufacturing an interior material according to the present invention can implement various and distinct light emission effects by disposing a light-blocking layer configured to block light emitted from a light source at a location adjacent to an inner transparent film and then allowing the component of the transparent film to fill lighting grooves formed by laser etching.

More specifically, the present invention provides a method of manufacturing an interior material, including the steps of:

(1-1) joining the lower surface of a material layer and a hot-melt layer together;

(1-2) attaching a support tape for supporting an island to the upper surface of the material layer;

(1-3) forming a first lighting groove, through which light passes, by laser-etching a predetermined portion of the hot-melt layer and the material layer;

(2-1) forming a light-blocking layer on the upper surface of a transparent film;

(2-2) attaching a binder to the lower surface of the transparent film;

(2-3) forming a second lighting groove, through which light passes, by laser-etching a predetermined portion of the light-blocking layer;

(3-1) combining a module resulting from step (1-3) with a module resulting from step (2-3);

(3-2) replacing the support tape on the material layer with a fresh support tape; and (3-3) obtaining an interior material by bonding a product from step (3-2) to a base material or an article to be processed, which has a base layer, to obtain a molding material, and then subjecting the molding material to an injection molding process, wherein the injection molding process is performed at high temperature such that the transparent film can be melted and stretched to fill the first and second lighting grooves.

Furthermore, the present invention provides an interior material manufactured by the above-described method.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Some embodiments of the present invention will be described in detail below with reference to the exemplary drawings.

It should be noted that the same reference symbols are assigned to the same components as much as possible even when they are shown in different drawings. In the following description of the embodiments, when it is determined that a detailed description of a related well-known function or configuration may make the gist of the present invention obscure, it will be omitted.

The following embodiments of the present invention are characterized by specifying a particular step of forming a blocking layer, i.e., a light-blocking layer, that determines the final shape of a logo lighting portion in an overall process, and a particular material for filling lighting grooves, i.e., guides through which light emitted from a light source passes.

Figure 1:
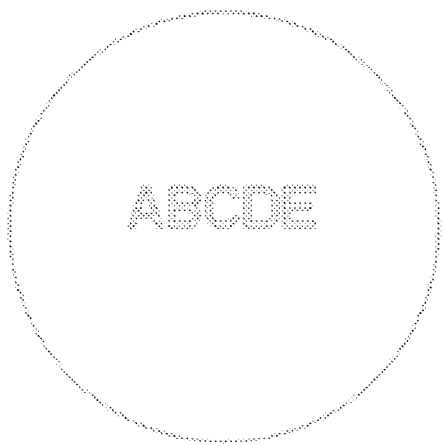
FIG. 1 is a view showing a molded article including a real wood material.
Figure 2A:
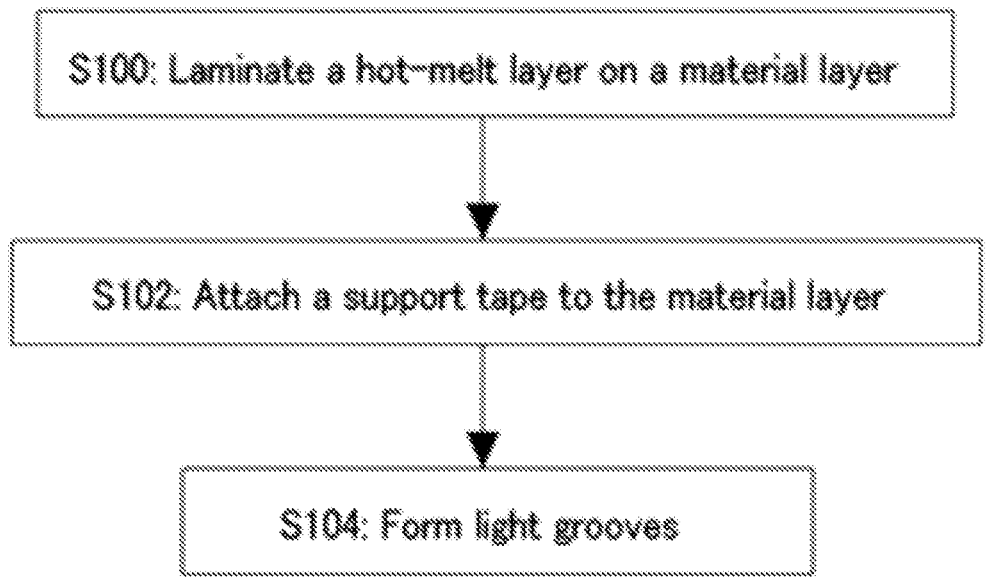
FIGS. 2*a* to 2*c* are flowcharts showing a method of manufacturing an interior material including a logo lighting portion according to an embodiment of the present invention.
Figure 2B:
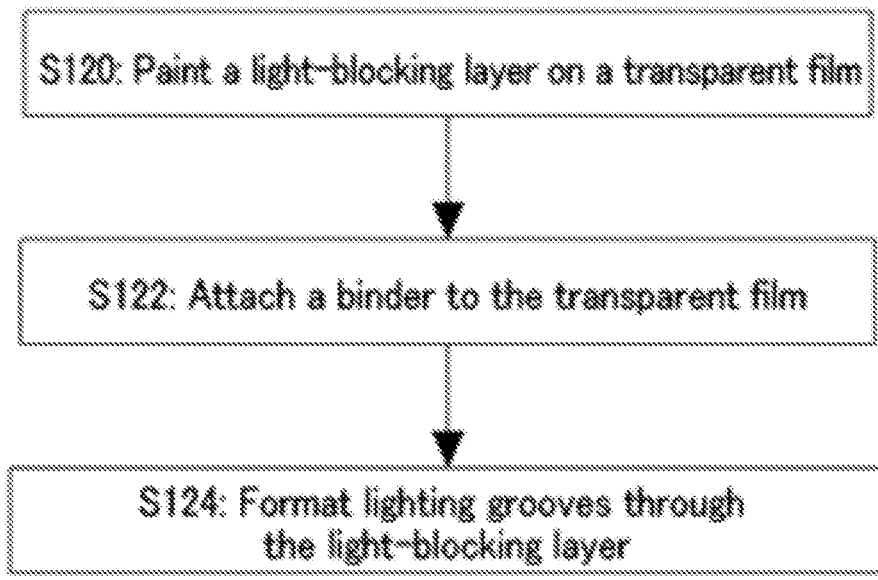
Figure 2C:
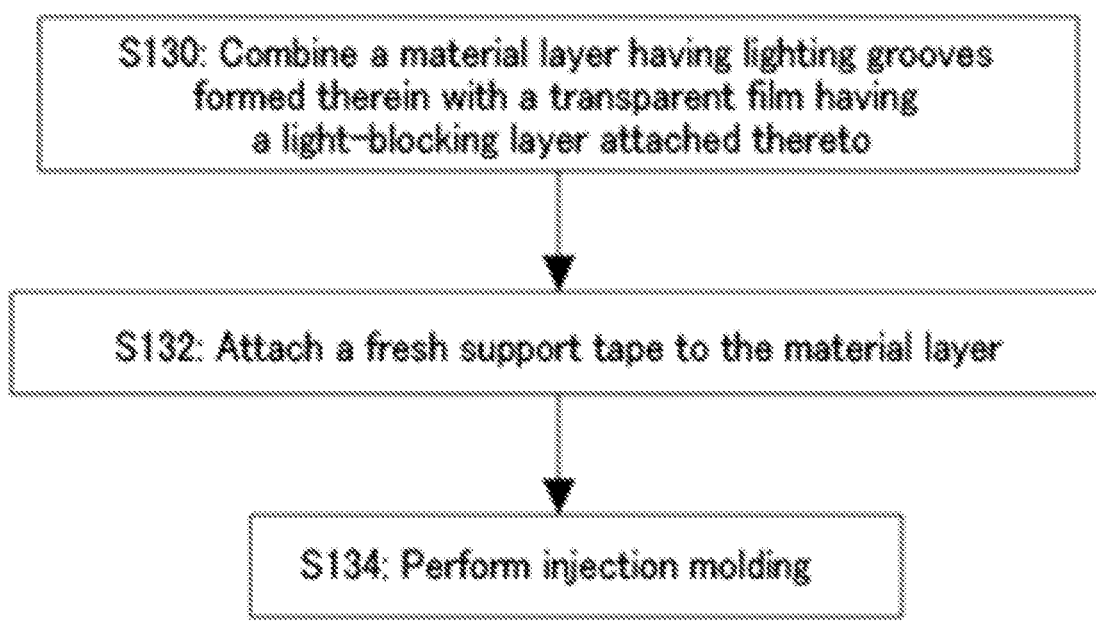

FIGS. 2a to 2c are flowcharts showing a method of manufacturing an interior material including a logo lighting portion according to an embodiment of the present invention; and FIGS. 3a to 3i are sectional views of members manufactured by the steps shown in FIG. 2. Items that are not specifically mentioned are the same as described in the previous embodiment.

Referring to these drawings together, first, a wood layer or material 10 is provided as a main material that forms the outer portion of the interior material. In this case, the "wood" is merely one example, and fabric, stone, artificial leather, carbon fiber reinforced plastic (CFRP), or glass fiber reinforced plastic (GFRP) may be used instead of the wood. A hot-melt layer 12 is placed on the lower surface of the material 10. The hot-melt layer 12 may include a nonwoven material, such as pulp, fiber or mesh, and a thermoplastic polymer composition having appropriate thermal reaction characteristics. The material layer 10 and the hot-melt layer 12 are joined together by, for example, a roll laminating process at step S100. Thereafter, a support tape 18 is attached to the other surface (i.e., the upper surface) of the material layer 10 in order to support an island at step S102. The support tape 18 functions to support and fix the island during a process of forming lighting grooves to be described below. The support tape 18 is made of, for example, a polyethylene terephthalate (PET)-based silicone material.

Thereafter, lighting grooves L1 and L2 that pass through the hot-melt layer 12 and the material 10 are formed by laser etching at step S104. The lighting grooves L1 and L2 are shown by way of example, and may be formed in the shape of one or more lines.

Figure 3A:
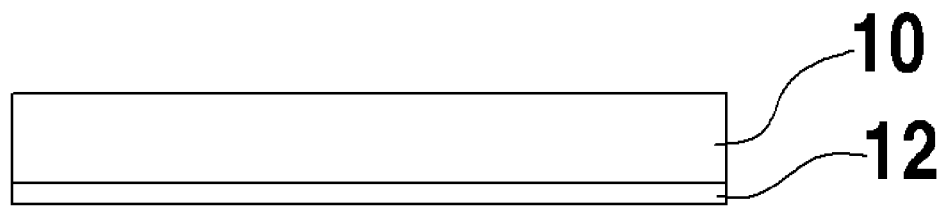
FIGS. 3*a* to 3*i* are sectional views of members manufactured by the steps shown in FIG. 2.
Figure 3B:
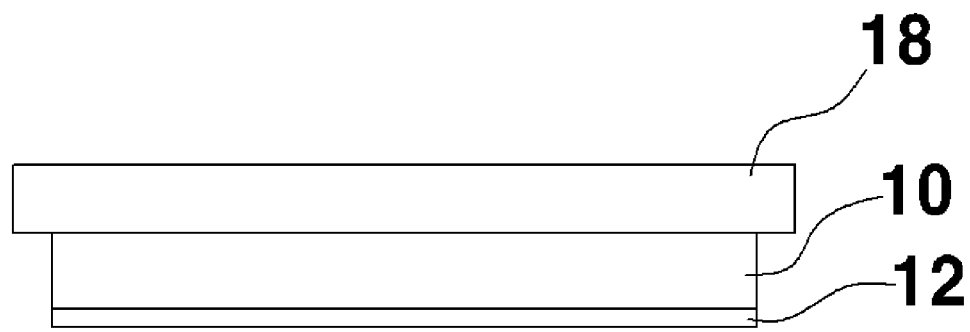
Figure 3C:
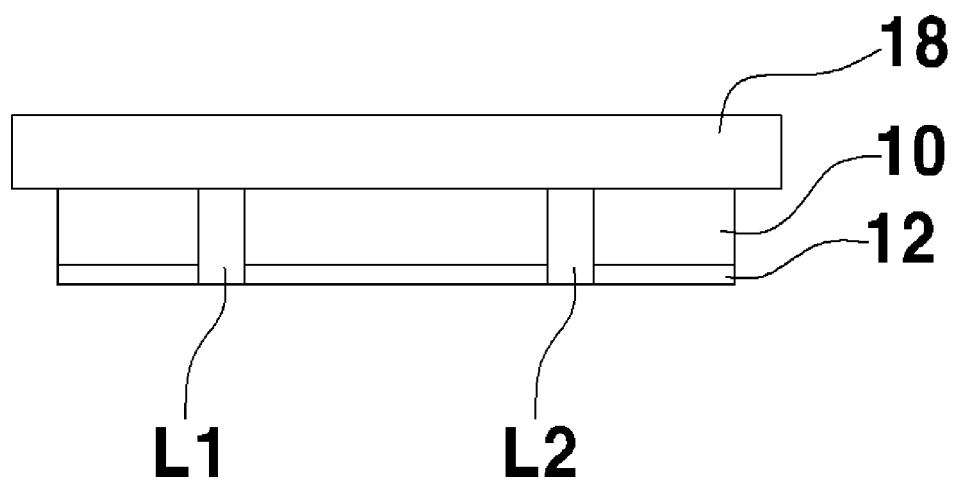
Figure 3D:
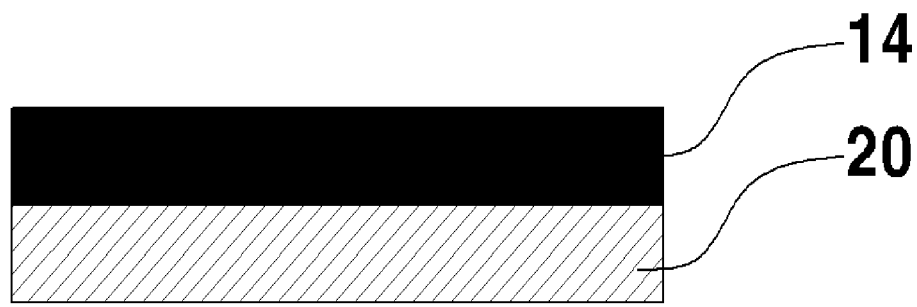
Figure 3E:
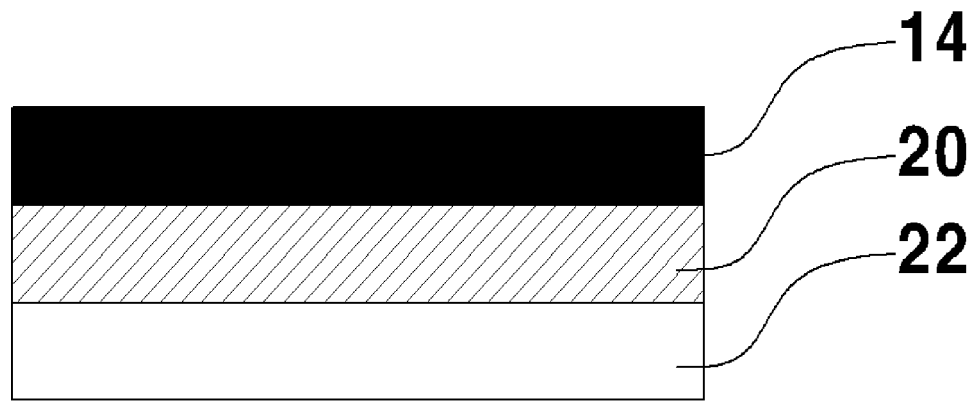
Figure 3F:
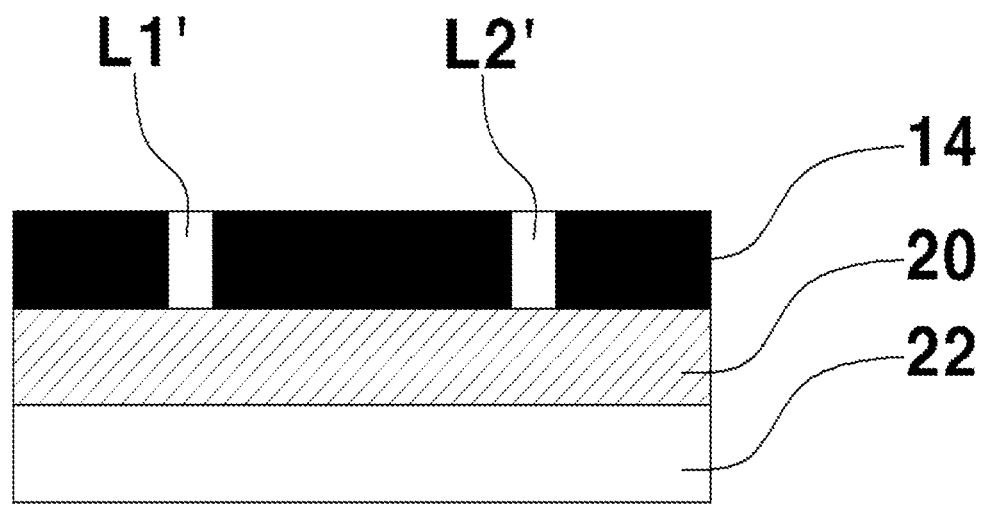

Separately from the above-described process, as shown in FIG. 3d, a light-blocking layer 14 is formed on the upper surface of a transparent film 20 by a printing or painting process at step S120. For the printing process, silk printing or pad printing is used, and, for the painting process, air spraying is used. To the lower surface of the transparent film 20 is attached a binder 22 at step S122. The transparent film 20 may be, for example, an optical transparent film made of a thermoplastic polymer selected from the group consisting of polycarbonate (PC), polyimide (PI), polyethersulfone (PES), polyarylate (PAR), poly(ethylene naphthalate) (PEN), polyethylene terephthalate (PET), a cycloolefin copolymer, and a mixture of two or more thereof. The binder 22 is preferably a copolymer, such as acrylic resin, but may also be made of a metal or ceramic material so as to be bonded to a base material layer.

Thereafter, lighting grooves L1' and L2' that pass through the light-blocking layer 14 are formed by laser etching at step S124.

Figure 3G:
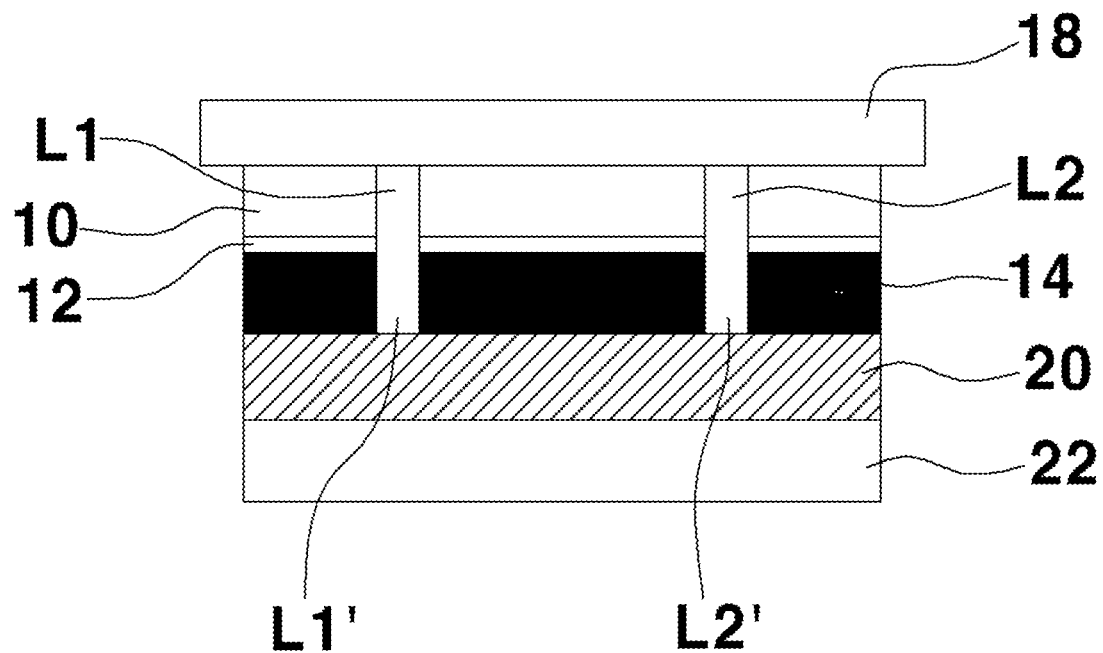
Figure 3H:
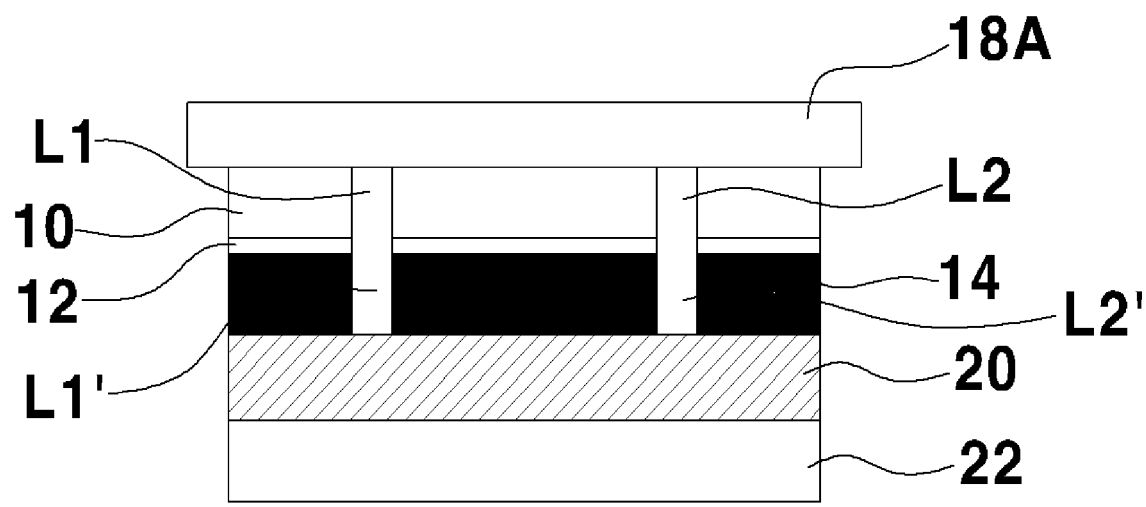

Thereafter, as shown in FIG. 3g, the material layer 10 resulting from step S104 and the transparent film 20 resulting from step S124 are bonded to each other by a heat pressing process at step S130. At this step, the lighting grooves L1 and L2 are vertically aligned with the lighting grooves L1' and L2' by means of a jig such that the upper and lower positions of a logo lighting portion can be vertically aligned.

In another embodiment of the present invention, for example, the lighting grooves L1 and L2 are formed to have a relatively large sectional area, and then the lighting grooves L1' and L2' of the light-blocking layer 14 subjected to the printing or painting step are formed by etching according to the shape of a desired logo pattern. In this case, since the final shape of the logo lighting portion depends on the shape of the lighting grooves L1' and L2', the lighting grooves L1 and L2 do not necessarily need to be vertically aligned with the lighting grooves L1' and L2', and various logo patterns may be achieved. A suitable combination of the shapes of the lighting grooves L1 and L2 and the lighting grooves L1' and L2' is advantageous for forming various lighting patterns.

Meanwhile, the support tape 18 located on the material layer 10 has a small powder precipitate produced during etching of the lighting grooves L1, L2, L1' and L2'. To remove this precipitate, the support tape is peeled off, and a fresh support tape 18A is attached at step S132. The support tape 18A functions to protect the upper surface of the material layer including an island during a molding process to be described below.

Figure 3I:
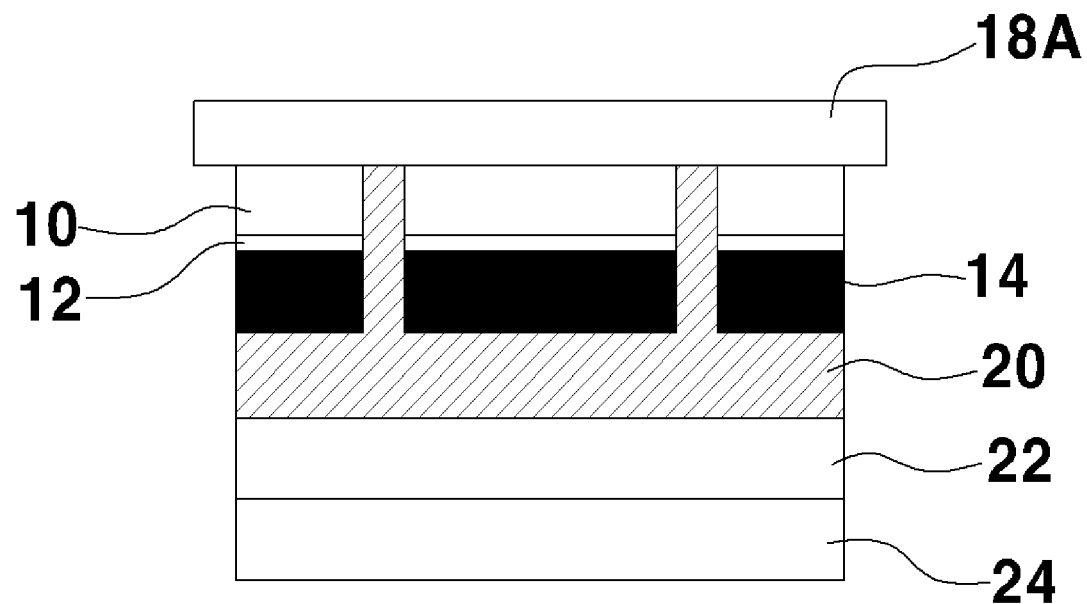

Finally, the resulting material is bonded to a base material or an article to be processed, which includes a base material layer 24, and is then subjected to an injection molding process, thereby obtaining an interior material at step S134. Since a light source (not shown) is disposed under the base material layer 24, the base material layer 24 is made of a transparent or semitransparent material, such as polycarbonate (PC) or acrylonitrile butadiene styrene (ABS) resin in order to enable sufficient light transmittance. As shown in FIG. 3i, the injection molding process is performed at high temperature such that the transparent film 20 is melted and stretched to fill the lighting grooves L1, L2, L1' and L2'.

As described above, according to the present invention, more distinct logo lighting can be made possible via the transparent film filling the lighting grooves in the interior material composed of two or more layers, and a foreign material can be prevented from entering the lighting grooves.

Furthermore, according to the present invention, the logo lighting portion having various patterns can be formed by forming the lighting grooves through the light-blocking layer printed or painted on the transparent film.

The method of manufacturing the interior material according to the present invention is simple, cost-effective, and advantageous in terms of cost saving.

Although the preferred embodiments of the present invention have been described for illustrative purposes, these are merely examples, and do not limit the scope of the present invention. Various modifications may be made without departing from the scope of the invention, and fall within the scope of the present invention. The scope of the present invention is defined based on the attached claims.

What is claimed is:

1. A method of manufacturing an interior material, comprising the steps of:
    (1-1) joining a lower surface of a material layer and a hot-melt layer together;
    (1-2) attaching a support tape for supporting an island to an upper surface of the material layer;
    (1-3) forming a first lighting groove, through which light passes, by laser-etching a predetermined portion of the hot-melt layer and the material layer;

(2-1) forming a light-blocking layer on an upper surface of a transparent film through printing or painting;

(2-2) attaching a binder to a lower surface of the transparent film;

(2-3) forming a second lighting groove, through which light passes, by laser-etching a predetermined portion of the light-blocking layer;

(3-1) combining a module resulting from step (1-3) with a module resulting from step (2-3);

(3-2) replacing the support tape on the material layer with a fresh support tape to form a product; and (3-3) obtaining an interior material by bonding the product from step (3-2) to a base material or an article to be processed, the base material and the article having a base layer, to obtain a molding material, and then subjecting the molding material to an injection molding process, wherein the injection molding process is performed at a predetermined temperature such that the transparent film is melted and stretched to fill the first and second lighting grooves.

2. The method of claim 1, wherein the transparent film is made of a thermoplastic polymer selected from the group consisting of polycarbonate (PC), polyimide (PI), polyethersulfone (PES), polyarylate (PAR), poly(ethylene naphthalate) (PEN), polyethylene terephthalate (PET), a cycloolefin copolymer, and a mixture of two or more thereof.

3. The method of claim 1, wherein the material layer is made of one of wood, fabric, stone, artificial leather, carbon fiber reinforced plastic (CFRP), and glass fiber reinforced plastic (GFRP).

4. The method of claim 1, wherein the first light groove and the second lighting groove are vertically aligned with each other.

* * * * *